United States Patent [19]

Kehse et al.

[11] 3,834,296
[45] Sept. 10, 1974

[54] CONTINUOUS PRODUCTION OF BEER WORT FROM DRIED MALT

[75] Inventors: Wolfgang Kehse, Ahrensburg; Uwe Jess, Hamburg, both of Germany

[73] Assignee: Extraktionstechnik Gesellschaft fur Anlagenbau mbH, Hamburg, Germany

[22] Filed: July 26, 1973

[21] Appl. No.: 382,714

[30] Foreign Application Priority Data
Aug. 1, 1972   Germany............................ 2237767

[52] U.S. Cl................................. 99/276, 99/277.2
[51] Int. Cl............................. C12c 7/14, C12c 7/16
[58] Field of Search .......... 99/275, 276, 277, 277.1, 99/277.2, 278; 191/127, 130, 132, 138

[56] References Cited
UNITED STATES PATENTS

| | | | |
|---|---|---|---|
| 2,811,336 | 10/1957 | Bready | 99/276 |
| 3,380,373 | 4/1968 | Lenz | 99/278 |
| 3,385,528 | 5/1968 | Schaus | 99/278 |
| 3,436,226 | 4/1969 | Schaus | 99/278 |
| 3,450,023 | 6/1969 | Lenz | 99/278 |
| 3,585,045 | 6/1971 | Lenz | 99/278 |

Primary Examiner—Robert W. Jenkins
Attorney, Agent, or Firm—Michael S. Striker

[57] ABSTRACT

An apparatus for continuously making beer wort from dried malt has a malt soaking unit and a malt crusher which is adapted to receive the soaked malt from the unit and has at least two smooth-surface cooperating rolls and drive means for driving them at differential velocities. A conduit system has a plurality of upright heatable conduit sections and serves for heating a mash which is produced after the malt has been treated in the crusher, and a clarifying unit is provided for clarifying the mash having been heated previously.

7 Claims, 3 Drawing Figures

CONTINUOUS PRODUCTION OF BEER WORT FROM DRIED MALT

BACKGROUND OF THE INVENTION

The present invention relates generally to the beer making art, and more particularly to the making of beer wort from dried malt. Still more particularly the invention relates to an apparatus for the continuous making of beer wort from dried malt.

In the beer making industry it is known to make beer wort in a discontinuous manner, rather than continuously. The malt required for making the wort must be dried and prepared before a mash is made, and this preliminary treatment of drying and preparation is of considerable importance. The malt must be comminuted and the finer it is comminuted, the more quickly the transformations taking place during the making of the mash, due to the reduced diffusion paths in the mash. On the other hand, the malt must not be comminuted too finely, because otherwise the recovery of the extract during clarification of the mash will not be possible within an economically feasible period of time and to an economically feasible extent. It is therefore known in the art that when the malt is comminuted, a medium grain size or particle size should be sought to be obtained. It is usually attempted to prevent comminuting the husks, so that during subsequent clarification they will provide for a loosening effect in the mash bed.

It has also been proposed in the art to provide for the continuous production of beer wort, and as was to be expected, the problems which have just been outlined with respect to the discontinuous production are even more pronounced if the production is on a continuous basis. It is particularly important in the continuous production of beer wort to be able to precisely and reproduceably coordinate the time periods required in the different processing stages, in order to prevent interruptions and consequent losses. It is known from a different art, namely he continuous extraction of oil seeds, to roll out the material to form thin flakes, which affords short diffusion paths in one direction (through the shorter dimension of the flakes), and on the other hand permits the formation of a relatively loose bed of material during the extraction. However, in the beer making art this approach has not been found feasible heretofore for the continuous making of beer wort, because the problems in the beer making art are more complicated than in the extraction of oil seed, due to the fact that intermediate the mechanical processing and the clarification the malt must undergo additional processing steps, namely the heat treatment of the mash in which the initially advantageous structure imparted by the mechanical treatment, such as the flakes formed in the oil seed treatment, can be destroyed whereby the advantages of the oil seed treatment would be negated if such an approach were attempted in the making of beer wort.

As a result of these problems the beer making industry has never found it feasible to resort to a continuous manufacture of beer wort, so that the discontinuous making is still the rule.

SUMMARY OF THE INVENTION

It is, accordingly, an object of the present invention to overcome the disadvantages of the prior art.

More particularly it is an object of the present invention to provide an improved apparatus before the continuous making of beer wort, which is not possessed of the prior art disadvantages.

Another object of the invention is to provide such an apparatus which will impart to the malt a flakelike structure, that is a structure which has been found to afford optimum advantages in terms of the subsequent processing steps to which the malt is to be subjected.

Another object of the invention is to provide such an apparatus in which the flake-like structure imparted to the malt is protected against damage during the subsequent processing operations.

In keeping with these objects, and with others which will become apparent hereafter, one feature of the invention resides, in an apparatus for continuously making beer wort from dried malt, in a combination which, briefly stated, comprises first means including a malt soaking unit and a malt crusher adapted to receive soaked malt from this unit. The crusher comprises at least two smooth-surfaced cooperating rolls and drive means for driving the same at differential velocity. Second means is provided, comprising a conduit system having a plurality of upright heating conduit sections, for heating a mash produced after treatment of the malt by the first means. Third means is provided for clarifying the mash after treatment of the same by the second means.

Tests which have been carried out have shown that the differential in the surface velocity of the smooth-surfaced rollers will produce optimum results in terms of converting the malt to a flake-like structure if the differential is between substantially 5 and 10 percent.

The conduit system advantageously has a continuous main conduit and branch conduits which are connected in parallel with portions of the main conduit. This arrangement permits the operation of the apparatus according to the decoction process which is preferred in many countries, namely a mashing process in which parts of the mash are removed, boiled, and returned into the main part of the mash in order to raise the whole to a temperature of about 75°C.

It is further advantageous if portions of the conduit system can be bypassed, with valves being interposed in the bypass by passes which can be opened and closed, whereby the apparatus can be readily adapted to various different operations in accordance with various different types of brewing processes.

The clarification of the mash can be obtained by using a conventional continuously operating extracter, for instance of the type known as a band extracter or as a basket-type band extracter. However, according to the present invention it is currently preferred to use a particular type of device, employing a rotor which rotates about an upright axis and is provided with a plurality of sector-shaped chambers, as will be discussed later.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
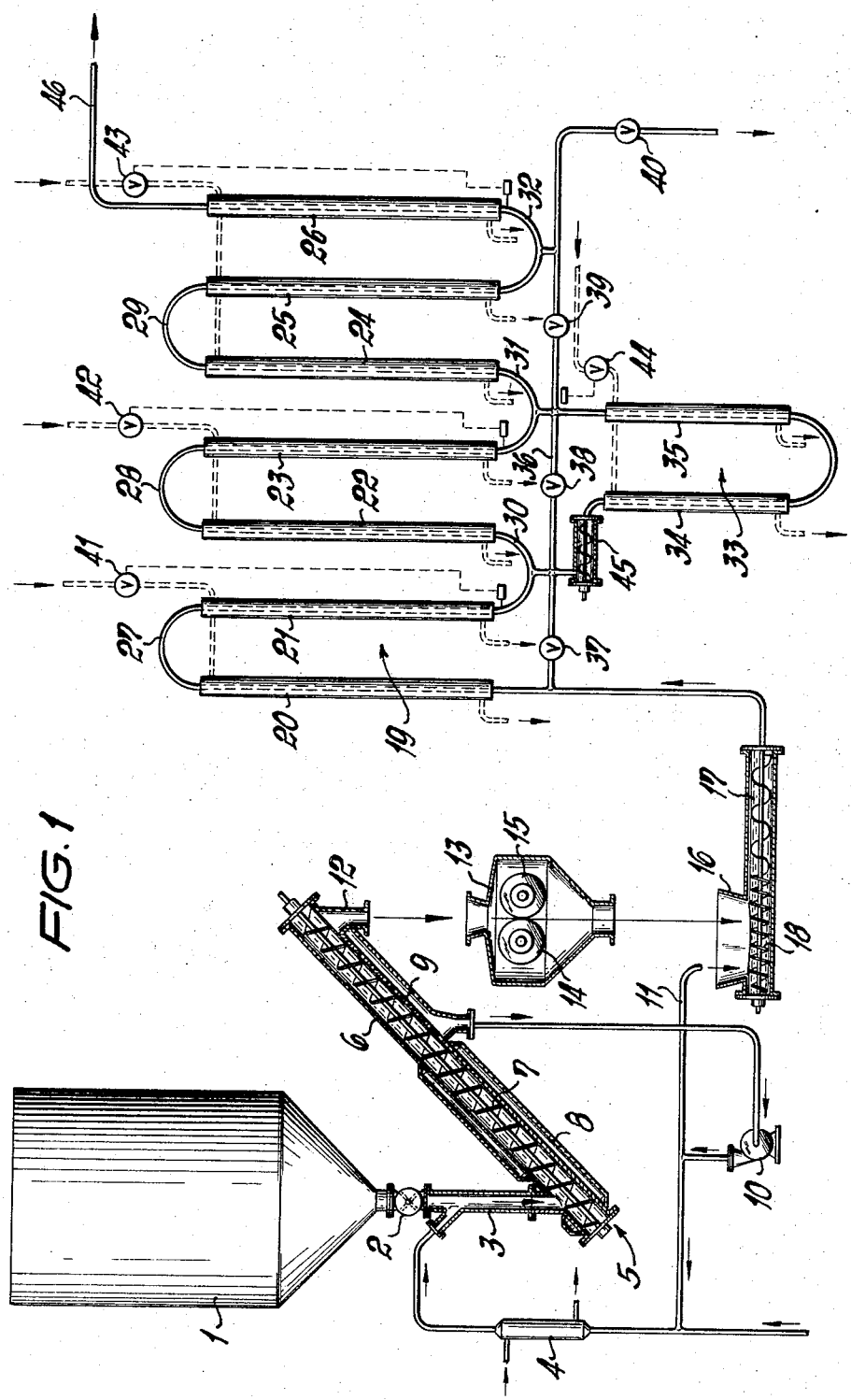
FIG. 1 is a diagrammatic fragmentary view of an apparatus according to the present invention.

Discussing now the drawing in detail it will be seen that reference numeral 1 identifies a silo accommodating dried malt which is discharged from the silo 1 by an adjustable metering device 2 into a discharge chute 3 into a soaking unit 5. The soaking unit 5 also receives soaking water which has been preheated in the heat exchanger 4 and which is also admitted via the chute 3.

The soaking unit 5 has a cylindrical housing 6 in which a conveyor screw 7 is mounted for rotation, the drive which rotates this screw 7 not having been illustrated because it is conventional. The housing 6 with the screw 7 is arranged so as to be upwardly inclined in the direction in which the malt is to be conveyed by the screw 7. The lower end portion of the housing 6, with which the chute 3 communicates, is surrounded by a heating jacket 8 through which a suitable heating fluid may be circulated in order to maintain the interior of the housing at the prescribed soaking temperature, which is advantageously approximately 45°C. The screw 7 is so constructed as to the spacing between its flights, its length and its number of revolutions per unit of time, that the malt will be subjected in the housing 6 to a soaking period ranging between 10 minutes and 1 hour, preferably approximately provided 20 minutes. The upper end portion of the housing is provided with a screen component 9 serving to separate the soaked malt from the soaking water. A pump 10 is provided which either recirculates the withdrawn water to the heat exchanger 4 via a portion of a conduit 11, or which—depending upon their particular requirements—may forward this water via another portion of the conduit 11 to the brewing and mash-making water in the apparatus.

The malt which has been soaked and now separated from the soaking water is discharged from the unit 5 through the upper outlet 12 and drops from this into a crusher 13. The crusher 13 has two rollers 14 and 15 which cooperate with one another and which are smooth at their respective circumference. The rollers 14 and 15 are made to rotate by appropriate drive means with differential peripheral velocity. The differential is advantageously between approximately 5 and 10 percent and the soaked malt grain is therefore subjected to a shear effect as it is crushed between the rollers, with the result that the malt grain is converted into flakes having a thickness of between 0.2 and 1.5 mm, preferably approximately 1 mm. Of course, the nip between the rollers 14 and 15 is set appropriately in order to obtain this thickness.

The thus produced malt flakes drop out of the crusher 13 and into a funnel-shaped receptacle 16 wherein they become admixed with mash-making water which is supplied through the conduit 11 arranged at the bottom of the receptacle 16 is a conveying screw 18 which conveys this mixture of flakes and water to a pump 17 which is a screw-type displacement pump, for instance a pump commercially available under the "Mohno" name, in which the flakes are subjected to only an insignificant shear effect so that they are not broken. The pump 17 advances the now created mash into the conduit system 19 which has a continuous main conduit composed of a plurality of vertically arranged conduit portions 20–26 which are alternately connected at their upper and lower ends by curved conduit portions 27–29 and 30–32. A branch conduit 33 configurated of hairpin-like shape is connected in parallel with a part of the main conduit and itself has upright conduit portions 34 and 35. Although in FIG. 1 the branch conduit 33 is shown to be located below the main conduit, this has been done only for the sake of clarity in illustration; in actual fact the branch conduit will normally be located at the same level as the main conduit, laterally thereof. In addition, the conduit system 19 is provided with a pipe 36 which is connected at several spaced locations with the main conduit, namely at the respective lowest portions of the lower curved conduit portions or elbows 30–32. The pipe 36 is also connected with the ends of the branch conduit 33 and valves 37–39 are arranged intermediate the connections with the pipe 36 so that the passage therethrough can be blocked or unblocked as required. In addition, a discharge valve 40 is accommodated in the pipe 36 to permit complete emptying of the latter.

The upright conduit portions 20–26, 34 and 35 are in form of double-walled pipes, thus forming heating jackets around the respective inner walls, so that a heated fluid can pass through these heating jackets and heat the contents of the respective conduit portions. Temperature regulating devices are provided which are designated with reference numerals 41–43 in the main conduit and with reference numeral 44 in the branch conduit 33. These temperature regulating devices are well known in the art and make it possible to maintain precisely predetermined temperatures in the individual portions of the conduit system 19, as is required for proper heat treatment of the mash.

The cross section of the various components of the conduit system 19 is so selected—given a certain throughput per unit of time—that a flow speed is obtained which is slightly greater than the rate of descent of the solid particles in the mash. This rate of descent is at a maximum approximately 0.05 m/s in the fresh mash water, and with increasing treatment time it decreases, due to the viscosity which rises as a result of greater concentration of wort in the mash, so that a median rate of descent of 0.02 m/s may be assumed. Assuming this rate of descent, the flow speed in the conduit system 19 should be between approximately 0.02 and 0.05 m/s. Thus, assuming a median flow speed of 0.025 m/s and a throughput of 700 l/h, a conduit diameter of approximately 100 mm would be provided. Of course, these are only exemplary figures.

It is also possible to select different conduit diameters for different portions of the conduit system 19, in order to more precisely accommodate the rate of descent to the respectively prevailing conditions. For instance, the cross section of the rising conduit portions can be somewhat greater than that of the descending conduit portions, that is those in which the mash descends rather than rises.

Assuming a maximum mash treatment time of 45 minutes, and a median flow speed of 0.025 m/s, the conduit system 19 will have a length of 67.5 m. Depending upon the type of beer to be brewed the mash treatment time may be less, and if so the treatment time can be reduced to the required time period by bypassing individual portions of the conduit system 19 in that one or more of the valves 37-39 in the pipe 36 is opened.

It is known to those skilled in the art that there are two basic mash-making processes, namely the infusion process and the decoction process. If the mash is to be made according to the infusion process, then only the main conduit is utilized. If, however, the decoction process is to be used, which is preferred in many countries, then a part of the mash is withdrawn via a metering pump 45 and passed through the branch conduit 33. This part is maintained at boiling point in accordance with the requirements of the decoction process. It will be clear that more than one such branch conduit can be provided, in which case each would be connected in parallel with a different portion of the main conduit, so that the apparatus could also operate according to the dual or triple mash processes.

After the mash has passed through the conduit system 19 it advances via the pipe 46 to a continuously operating clarification device. In accordance with the embodiment illustrated in FIGS. 1-3 this clarification device is a so-called carousel extractor 47 having a housing which accommodates a rotor 48 which turns at constant speed in the direction of the arrow 62 about a vertical axis. The rotor 48 has a cylindrical wall which is subdivided in its hollow interior by radial divider walls 49 into a number of upright sector-shaped chambers 50-61. Each complete revolution of the rotor 48 requires between substantially 1½ and 5 hours, depending upon the type of beer to be brewed. Closely adjacent the bottom of the rotor 48, at a spacing of only a few millimeters from the same, there is provided a stationary screen wall 63 having screen slots which are exactly concentric with the axis of rotation of the rotor 48. The wall 63 is provided with a sector-shaped opening 64 and laterally adjacent thereof, in direction towards the inlet conduit 46, a sector of the wall 63 is free of screen slots. A space 65 is provided beneath the wall 63 which is subdivided by stationary walls into several sector-shaped chambers.

The mash is supplied continuously and first enters into the chamber 50 of the rotor 48, that is the chamber which in the drawing is just beneath the outlet opening of the pipe 46. The mash passes through the chamber 50 which, like all the other chambers, is open at the bottom, and then passes through the wall 63 to be collected in the chamber of the space 65 which is beneath it. It is now withdrawn by a pump 66 and is sprayed via a spray arm 66' back onto the bed of mash accommodated in the various chambers of the rotor 48, and in this case into the chamber 51 in which the bed of mash has already settled down and formed a filtered layer. The passage of the mash liquid through the bed in the chamber 51 results in removal of the impurities which were still contained in the mash liquid as it passed through the chamber 50. As the liquid passes out of the chamber 51 into the corresponding chamber of the space 55, it has been clarified and is removed by the pump 67. During further rotation of the rotor 48 sprinkling water can be sprayed onto the bed of mash in the rotor, as suggested with respect to the chambers 55, 56 and 57 in the drawing, by means of stationary spray arms 68, 69 and 70. Beneath the chambers 55, 56 and 57 the individual weak worts thus obtained are collected and either added to the initial stronger wort obtained from the run-off of the liquid through the chamber 51 or, as shown with respect to the chamber 52, they are in part sprayed back onto the bed of mash in the roller 48 by means of the arm 71 which is a spring arm.

Figure 2:
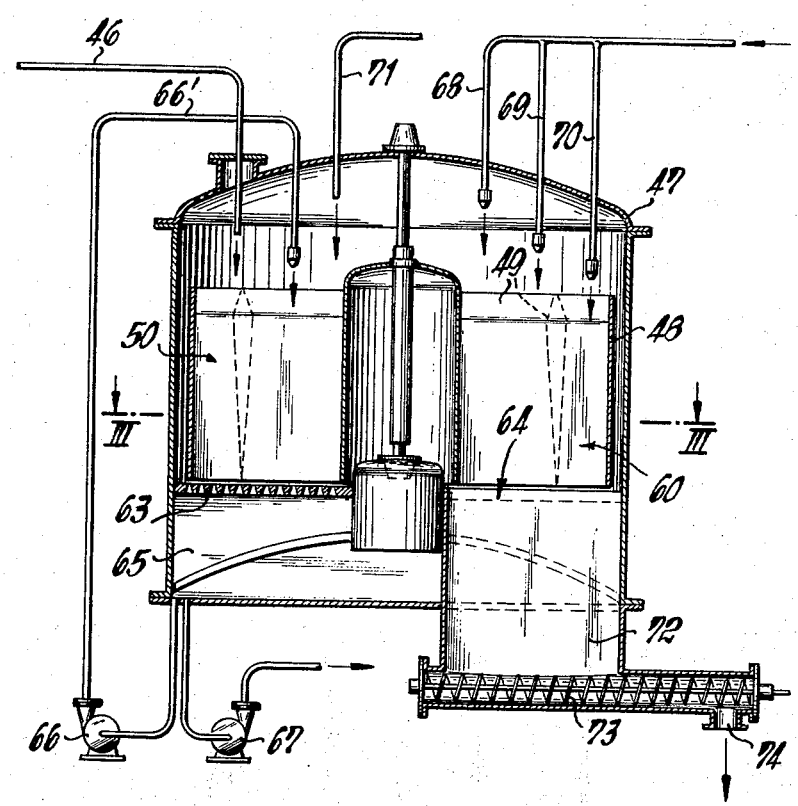
FIG. 2 is a diagrammatic fragmentary elevational view, illustrating another portion of the apparatus which is not shown in FIG. 1, so that FIG. 2 should be considered in conjunction with FIG. 1, FIG. 2 being a section taken on line II—II of FIG. 3.
Figure 3:
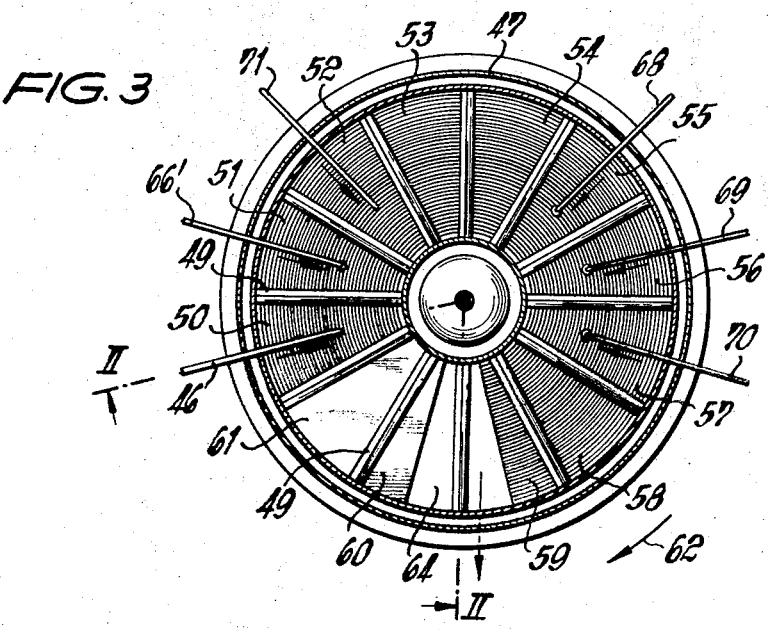
FIG. 3 is a section taken on line III—III of FIG. 2.

During the last portion of each revolution of the rotor 48, in FIGS. 2 and 3 approximately from the position at which the chamber 58 is shown to be located, no further liquid is added onto the bed of solids in the rotor, that is the mash bed. This portion of the extractor serves for dripping-off of the draff, which passes through the opening 64 (when the respective chamber moves into registry therewith) into the discharge chute 77 to be engaged by a conveyor screw 73 and to be advanced to an outlet 74 from which it passes through the draff press to be freed of liquid contents.

It will be appreciated that the present invention provides advantages not to be found in the prior art in accordance with the current state of the same. Thus, the cooperation of the rollers 14 and 15 rotating at differential velocity, in conjunction with the unit 5, provides for a conversion of the mash to a flake-like consistency and configuration. At the same time a minimum of fines is created and the husks are largely protected against comminution. The structural strength of the individual flakes is relatively good, and on the other hand the cell structure of the malt is destroyed sufficiently during conversion to this flake-shaped configuration, that in conjunction with the strong reduction of the effective diffusion path length obtained by conversion into the flake-shaped configuration, the conversion processes during the mash-making operation in the conduit system 19 can take place relatively rapidly and without hindrance. Insofar as the mash-making operation itself is concerned, it is advantageous that in the rising conduit portions 20, 22, 24 and 26, and possibly also 35, the flakes of malt tend to slightly remain somewhat behind the wort, whereas they tend to advance ahead of the wort slightly in the descending conduit portions 21, 23 and 25, and possibly also 34, so that these flakes will constantly come into contact with new amounts of wort. The flakes are subjected to no mechanical processing, such as turbulent flow or contact with stirrers, so that they will remain largely intact and will not be broken up. In the extracter 47 there will form a loose bed having good percolating ability, and this is assisted by the fact that the husks have not been comminuted and will facilitate deformation of a loose bed. The height of the bed, that is the thickness in vertical direction in the rotor 48, may be between substantially 30 and 100 cm. By the arrangement of the sieve slots in the wall 63, in such a manner that they coincide with the direction of rotation of the rotor 48, we assure that aside from the friction involved, no other mechanical forces act upon the bed of mash, which is particularly advantageous in terms of maintaining the proportion of impurities small in the beer wort being produced.

It will be understood that each of the elements described above, or two or more together, may also find a useful application in other types of constructions differing from the types described above.

While the invention has been illustrated and described as embodied in an apparatus for the continuous production of beer wort from dried malt, it is not intended to be limited to the details shown, since various modifcations and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In an apparatus for continuously making beer wort from dried malt, a combination comprising first means comprising a malt soaking unit and a malt crusher adapted to receive soaked malt from said unit, said crusher comprising at least two smooth-surfaced cooperating rolls and drive means for driving the same at differential velocity; second means, comprising a conduit system having a plurality of upright heatable conduit sections, for heating a mash produced after treatment of the malt by said first means; and third means for clarifying the mash after treatment of the same by said second means.

2. A combination as defined in claim 1, wherein said drive means comprises a drive operative for rotating said rollers at a velocity differential of between substantially 5–10percent.

3. A combination as defined in claim 1, wherein said conduit system comprises a main conduit having a plurality of conduit portions, and a plurality of secondary conduits each of which is connected in parallel with one of said conduit portions of said main conduit.

4. A combination as defined in claim 1, wherein said conduit system comprises a plurality of conduit portions, bypass conduits bridging some of said conduit portions, and valve means for selectively blocking and unblocking said bypass conduits.

5. A combination as defined in claim 1, wherein said third means comprises a circular rotor mounted for rotation about an upright axis and having a plurality of downwardly open sector-shaped chambers for the mash, and a stationary wall member directly beneath said rotor and provided with a plurality of sieve slots concentric to said axis for passage of mash which issues from the respective chambers.

6. A combination as defined in claim 5, wherein said wall member has a sector-shaped opening adapted to register with each of said chambers once during each revolution of said rotor, for discharge of solid matter from the respective chamber through said opening.

7. A combination as defined in claim 5, wherein said conduit means has an outlet arranged above said rotor, and wherein said chambers have upper open ends into which said outlet discharges mash when the respective upper open ends are located beneath said outlet.

* * * * *